US012037825B2

(12) United States Patent
Boesch et al.

(10) Patent No.: US 12,037,825 B2
(45) Date of Patent: Jul. 16, 2024

(54) FURNITURE FITTING

(71) Applicant: Julius Blum GmbH, Hoechst (AT)

(72) Inventors: Albert Boesch, Gaissau (AT); Wilfried Violand, Gaissau (AT)

(73) Assignee: JULIUS BLUM GMBH, Hoechst (AT)

( * ) Notice: Subject to any disclaimer, the term of this patent is extended or adjusted under 35 U.S.C. 154(b) by 53 days.

(21) Appl. No.: 17/967,367

(22) Filed: Oct. 17, 2022

(65) Prior Publication Data

US 2023/0030015 A1 Feb. 2, 2023

Related U.S. Application Data

(63) Continuation of application No. PCT/AT2021/060136, filed on Apr. 22, 2021.

(30) Foreign Application Priority Data

May 7, 2020 (AT) .............................. A 50390/2020

(51) Int. Cl.
*E05D 11/00* (2006.01)
*E05D 3/06* (2006.01)
(Continued)

(52) U.S. Cl.
CPC ................ *E05D 11/02* (2013.01); *E05D 3/06* (2013.01); *E05F 1/1261* (2013.01); *E05Y 2900/20* (2013.01)

(58) Field of Classification Search
CPC ..... E05F 1/1276; E05F 1/1246; E05F 1/1253; E05F 1/1261; E05F 1/1058; E05F 1/1075;
(Continued)

(56) References Cited

U.S. PATENT DOCUMENTS 3,939,529 A * 2/1976 Davis .................... E05D 15/466 16/342
5,208,944 A * 5/1993 Lu ......................... E05F 1/1215 16/340
(Continued)

FOREIGN PATENT DOCUMENTS

CN 101743372 6/2010
CN 102822541 12/2012
(Continued)

OTHER PUBLICATIONS

International Search Report issued Jun. 22, 2021 in International (PCT) Application No. PCT/AT2021/060136.

*Primary Examiner* — Chuck Y Mah
(74) *Attorney, Agent, or Firm* — WENDEROTH. LIND & PONACK, L.L.P.

(57) ABSTRACT

A furniture fitting for movably supporting a furniture part on a furniture carcass, includes a first component and a second component. The two components are connected to each other via at least one pivot bearing having a bearing axis, and the first component includes a first wall. The at least one pivot bearing includes at least one capillary disc having a second wall, and the second wall is spaced from the first wall of the first component by a, preferably annular, gap having a gap width. The gap width at least partially decreases radially in a direction of the bearing axis, so that a lubricant filled into the gap can be transferred radially in a direction towards the bearing axis and/or along the bearing axis by a capillary force.

16 Claims, 5 Drawing Sheets

(51) Int. Cl.
*E05D 11/02* (2006.01)
*E05F 1/12* (2006.01)

(58) Field of Classification Search
CPC .... E05F 5/02; E05F 3/20; E05F 11/54; E05D 3/16; E05D 3/06; E05D 11/00; E05D 11/02; E05D 15/40; E05D 15/401; E05D 2003/163; E05D 3/12; E05Y 2201/10; E05Y 2201/256; E05Y 2201/21; E05Y 2201/264; E05Y 2201/47; E05Y 2201/492; E05Y 2201/416; E05Y 2201/474; E05Y 2900/20; E05Y 2900/202; E05Y 2600/10; E05Y 2600/41; A47B 2220/0072; Y10T 16/5383; Y10T 16/547; Y10T 16/5476; Y10T 16/5321; Y10T 16/5322; Y10T 16/53225
See application file for complete search history.

(56) References Cited

U.S. PATENT DOCUMENTS 5,269,047 A * 12/1993 Lu .......................... E05D 11/087 16/340
5,667,347 A * 9/1997 Matthews ............. F16D 1/0841 83/543
5,687,453 A * 11/1997 Megregian .......... E05D 11/0081 16/221
5,772,351 A * 6/1998 Ching ................... G06F 1/1681 16/337
5,937,482 A * 8/1999 Horng ................... G06F 1/1681 16/337
6,163,928 A * 12/2000 Chung .................. E05D 11/087 16/337
6,233,785 B1 5/2001 Tanahashi
8,573,849 B2 11/2013 Leiseder
8,701,247 B1 * 4/2014 Shargh .................... E05D 11/02 16/386
8,806,717 B2 8/2014 Scheck et al.
8,893,352 B2 11/2014 Hasler
10,100,563 B2 10/2018 Murray et al.
11,248,406 B2 2/2022 Nordieker et al.
2003/0056322 A1 * 3/2003 Chae ..................... G06F 1/1681 16/281
2004/0057813 A1 * 3/2004 Horng ................... F16B 43/002 411/534
2004/0074050 A1 * 4/2004 Birtley .................. E05D 11/087 16/340
2004/0244148 A1 * 12/2004 Cho ...................... G06F 1/1616 16/340
2010/0192328 A1 8/2010 Scheck et al.
2013/0011091 A1 1/2013 Leiseder
2013/0104340 A1 5/2013 Hasler
2018/0100337 A1 4/2018 Murray et al.
2019/0048635 A1 2/2019 Murray et al.
2020/0362612 A1 11/2020 Nordieker et al.
2021/0189780 A1 * 6/2021 Nordieker ............. E05D 7/0415

FOREIGN PATENT DOCUMENTS

CN 208534280 2/2019
CN 109538041 A * 3/2019
DE 102008049747 A1 * 4/2010 .............. F16C 17/10
EP 2 586 944 5/2013
FR 2 732 399 10/1996
JP 6-81534 3/1994
JP 2000-46039 2/2000
JP 2007-32174 2/2007
JP 2013-144924 7/2013
WO WO-2009060028 A1 * 5/2009 .............. F16C 17/10
WO 2017/096413 6/2017

* cited by examiner

C

FURNITURE FITTING

BACKGROUND OF THE INVENTION

The present invention relates to a furniture fitting for movably supporting at least one furniture part on a furniture carcass, the furniture fitting comprising at least a first component and at least a second component, wherein the two components are connected to each other via at least one pivot bearing having a bearing axis, and wherein the at least one first component includes at least a first wall.

Moreover, the invention concerns an item of furniture comprising a furniture carcass and at least one furniture part movably supported relative to the furniture carcass, in particular a furniture flap configured to pivot relative to the furniture carcass about a horizontally extending axis, wherein the item of furniture includes at least one furniture fitting of the type to be described.

Finally, the invention relates to a method for producing a furniture fitting of the type to be described.

The hinged connection of two components of a furniture fitting is frequently realized by a forming process, the so-called flaring or collar-forming. In a first step, a recess, for example a cylindrical hole, is arranged on a first component of the furniture fitting. Subsequently, a collar-forming tool is introduced into the recess of the first component in a first movement direction. After the collar-forming tool has been introduced into the recess, the collar-forming tool is rotated and a form stamp of the collar-forming tool is extended. Subsequently, the peripheral edge of the recess is slowly pulled in a second movement direction, opposite the first movement direction, by the rotating form stamp, until the characteristic neck or collar is produced. This neck or collar forms a pivot bearing having an increased supporting surface on which the second component of the furniture fitting can be pivotally supported. However, due to the formation of a neck or a collar, there is also the drawback that the constructional height of the furniture fitting is increased.

In recent times, manufactures have shifted to integrate furniture fittings (in particular actuating drives for furniture flaps) entirely or also partially within a furniture panel of a furniture carcass. In this way, the furniture fitting barely comes into appearance from a visual point of view. Therefore, it is a primary goal to design the furniture fitting as compact as possible (that is to say with a low thickness), so that a top layer of the furniture panel remains on both sides of the housing in a mounted condition of the furniture fitting.

SUMMARY OF THE INVENTION

It is an object of the present invention to propose a furniture fitting of the type mentioned in the introductory part, which can be designed in a compact manner and which shall have a long lifespan.

According to the invention, the at least one pivot bearing includes at least one capillary disc having at least a second wall, the second wall being spaced from the first wall of the first component by a, preferably annular, gap having a gap width, and the gap width at least partially decreases radially in a direction of the bearing axis, so that a lubricant filled into the gap can be transferred radially in a direction towards the bearing axis and/or along the bearing axis by a capillary force.

In tribology (that is to say, in the teaching of friction dealing with friction, wear, lubrication and optimization of frictional elements movably arranged relative to one another), the supply of a bearing location with a lubricant is one of the decisive factors in view of the lifespan of the pivot bearing.

The invention is now based on the basic concept to improve the flow of the lubricant within a narrow gap of the pivot bearing of the furniture fitting with the aid of a capillary disc. As a result, the lubricant is pulled into the gap by capillarity, and the lubricant can be distributed in the region of the pivot bearing in an improved manner. In this way, the pivot bearing can be sufficiently supplied with lubricant and the lifespan of the furniture fitting can be increased. Moreover, the production of a neck or a collar in the region of the bearing location can be omitted. This has the advantage the furniture fitting can be compactly designed (that is to say without the presence of thick lever assemblies).

According to an embodiment, the second wall of the at least one capillary disc extends inclinedly in a first gap section, and extends parallel to the first wall of the first component in a second gap section. Preferably, the two walls enclose an angle of between 15° and 45°, particularly preferred an angle of 30°, relative to one another in the first gap section.

Accordingly, the first, inclinedly extending gap section thus forms a depot for the lubricant, from which the lubricant can be distributed in a radial direction towards the bearing axis and along the bearing axis.

The at least one capillary disc, in a cross-section, can be configured at least partially frustoconical. Thereby, the smaller of the two bases of the frustoconical cone faces towards the first component.

The at least one first component can include at least two partial sections mutually spaced from each other in a direction of the bearing axis, and the second component is at least partially arranged between the two partial sections of the first component.

The bearing axis can be configured, for example, as a rivet, and at least one capillary disc is received between a, preferably broadened, end portion of the rivet and the first wall of the first component.

According to a further embodiment, at least one capillary disc can be at least partially arranged between the two components.

According to a preferred embodiment, the furniture fitting includes a housing and at least one actuating arm assembly configured to pivot relative to the housing, the actuating arm assembly having at least two actuating arms connected to each other by the at least one pivot bearing.

The item of furniture according to the invention includes a furniture carcass and at least one furniture part movably-supported relative to the furniture carcass, in particular a furniture flap configured to pivot relative to the furniture carcass, and the item of furniture includes at least one furniture fitting of the type in question.

Preferably, the furniture carcass includes at least one furniture panel, and a housing of the furniture fitting, in a mounted condition, is substantially entirely received within the furniture panel of the furniture carcass.

The method according to the invention for producing a furniture fitting is characterized by the following steps:

- the two components of the furniture fitting are connected to each other by the bearing axis of the at least one pivot bearing, and the at least one capillary disc is arranged on the bearing axis between the two walls under the formation of the gap,
- a lubricant is filled into the gap, and the lubricant is transferred by a capillary force in a radial direction towards the bearing axis and/or along the bearing axis.

According to an embodiment, the bearing axis is configured as a rivet, and at least one end portion of the rivet is deformed in a further method step. Preferably, the at least one capillary disc is received between the first wall and the deformed end portion of the rivet.

Preferably, the at least one capillary disc is configured as a member separate from the two components. However, it is also conceivable that the at least one capillary disc and one of the components are formed together to as to have a one-piece configuration.

BRIEF DESCRIPTION OF THE DRAWINGS

Further details and advantages of the present invention will be explained with the aid of the following description of figures.

DETAILED DESCRIPTION OF THE INVENTION

Figure 1A:
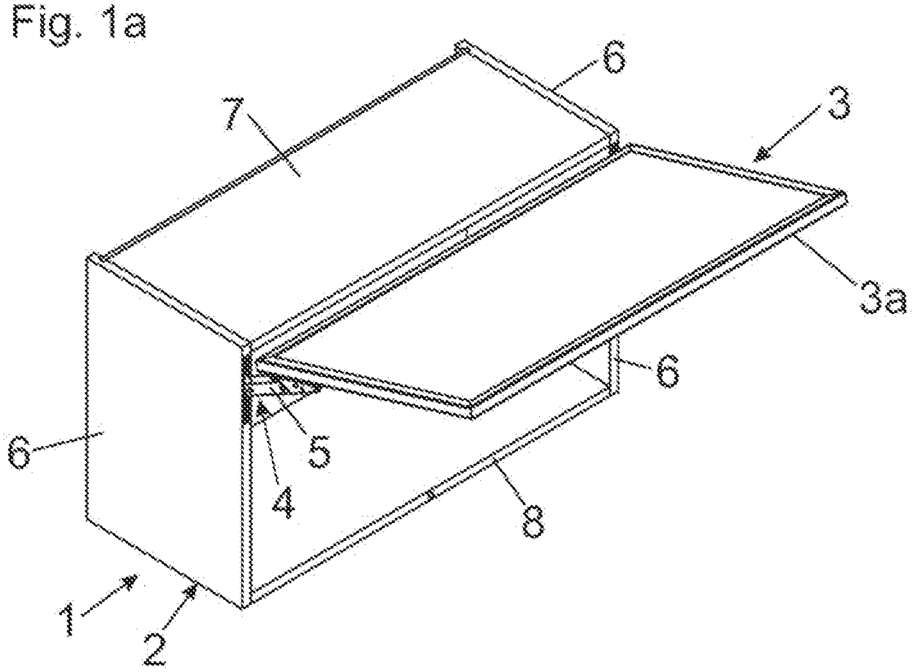
FIG. 1*a*, 1*b* show an item of furniture with a movable furniture part in a perspective view and in an exploded view.

FIG. 1*a* is a perspective view of an item of furniture 1 comprising a furniture carcass 2, a furniture part 3 movably supported relative to the furniture carcass 2, and a furniture fitting 4, for example in the form of a furniture drive 4*a*, for moving the movable furniture part 3.

The item of furniture 1 includes furniture panels 6 in the form of sidewalls, a top panel 7 and a bottom panel 8. For example, the movable furniture part 3 can be in the form of a furniture flap 3*a* configured to pivot about a horizontal axis relative to the furniture carcass 2.

In the shown embodiment, a housing 9 of the furniture fitting 4 is at least partially, preferably substantially entirely, received within the furniture panel 6 configured as a sidewall. The movable furniture part 3 is movably supported relative to the furniture carcass 2 between a closed position in which the furniture carcass 2 is covered, and an elevated open position.

Of course, it is also possible to integrate the furniture fitting 4 within a horizontally extending furniture panel, thus within the top panel 7, within the bottom panel 8 and/or within a shelf arranged between the top panel 7 and the bottom panel 8 for example. In such a case, the movable furniture part 3 is pivotally supported relative to the furniture carcass 2 about a vertically extending axis in the mounted position.

In the shown embodiment, the furniture fitting 4 includes an actuating arm assembly 5 for moving the movable furniture part 3, and at least one spring device 10 (FIG. 1*b*) for applying a force to the actuating arm assembly 5.

Figure 1B:
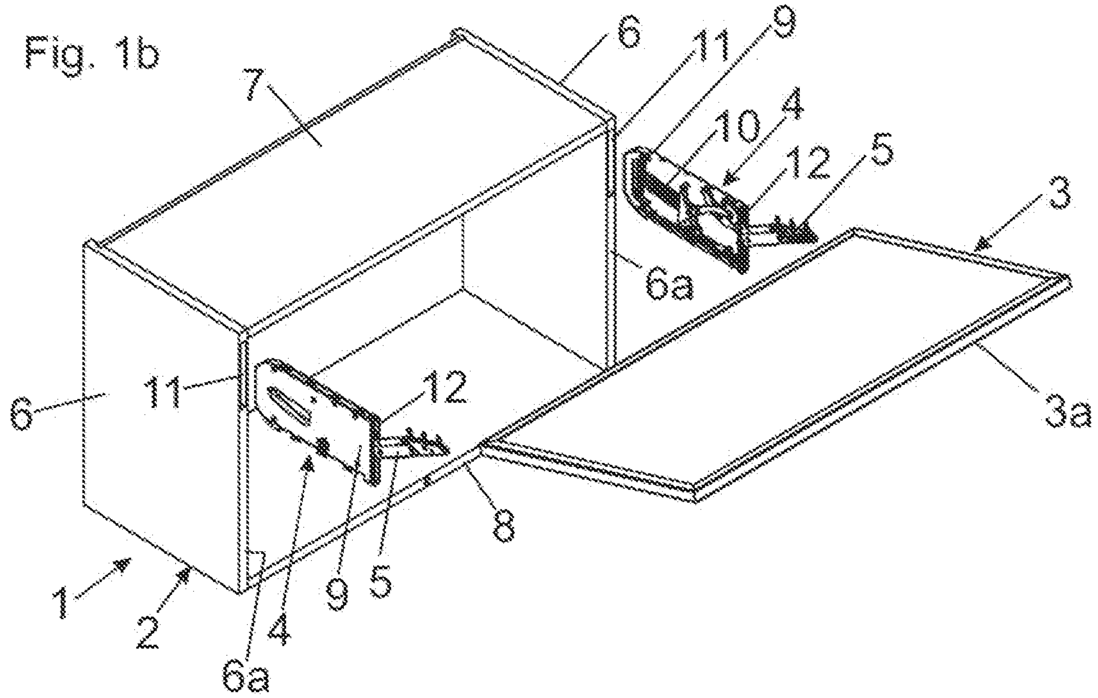

FIG. 1*b* shows the item of furniture 1 in an exploded view. Two furniture fittings 4, preferably configured to be identical in construction, in the form of furniture drives 4*a* for moving the movable furniture part 3 are provided. Each of the furniture fittings 4 includes a housing 9 configured to be fixed to the furniture carcass 2. According to an embodiment, it can be provided that the housing 9 of the furniture fitting 4, in a mounted condition, is at least partially, preferably substantially entirely, received within a recess 11 of the furniture panel 6 configured as a sidewall. In a mounted condition, the housing 9 can be arranged substantially flush with a front face 6*a* of the furniture panel 6.

The recess 11 can be in the form of a blind hole for example. Upon mounting, the housing 9 of the furniture fitting 4 can be inserted from the front (that is to say from the narrow front face 6*a* of the furniture panel 6) into the pocket-shaped recess 11 of the furniture panel 6. In a mounted condition, the recess 9 of the furniture fitting 4 is substantially entirely received within a predetermined wall thickness of the furniture panel 6.

At least one spring device 10 for applying a force to the actuating arm assembly 5 is arranged within or on the housing 9. A cover 12 is provided at the front-end of the housing 9, and at least one movably-supported component 5*a*, 5*b*, 5*c* (FIG. 3*a*) of the actuating arm assembly 5 can be guided through the cover 12 in a relative position.

Figure 2:
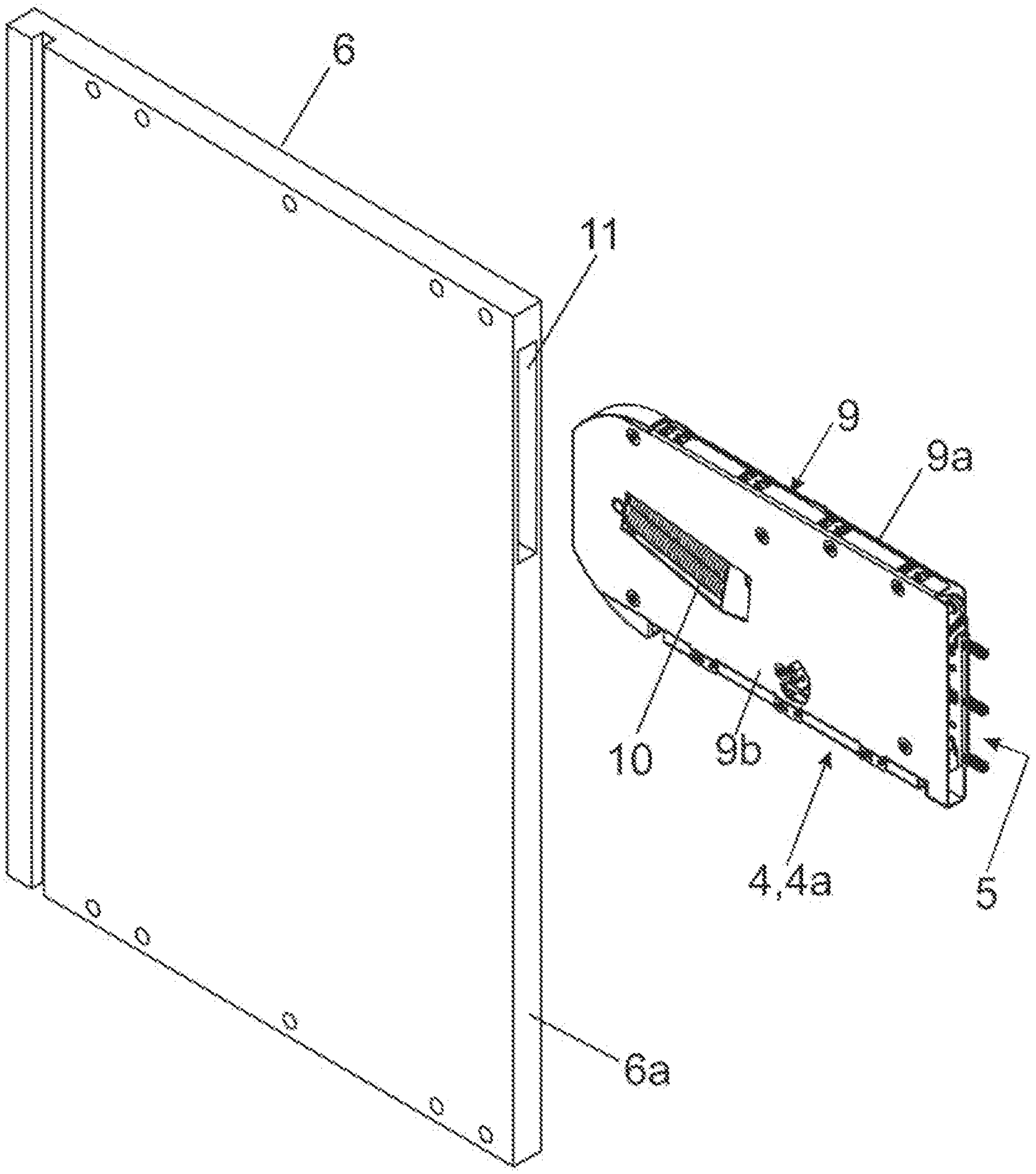
FIG. 2 is a perspective view of a furniture fitting configured to be arranged within a furniture panel.

FIG. 2 shows a perspective view of the furniture fitting 4 configured to be arranged within the furniture panel 6. In a mounted condition, the housing 9 of the furniture fitting 4 is substantially entirely received within the furniture panel 6. The furniture panel 6 includes a recess 11 configured to receive the furniture fitting 4, the recess 11 being in the form of a blind hole for example.

The housing 9 of the furniture fitting 4 can be configured substantially cuboidal. In the shown embodiment, the housing 9 includes two flat-shaped housing walls 9*a*, 9*b* mutually spaced from each other in a parallel relationship. The actuating arm assembly 5 for moving the movable furniture part 3 and the spring device 10 for applying a force to the actuating arm assembly 5 can be received between the housing walls 9*a*, 9*b*.

Figure 3A:
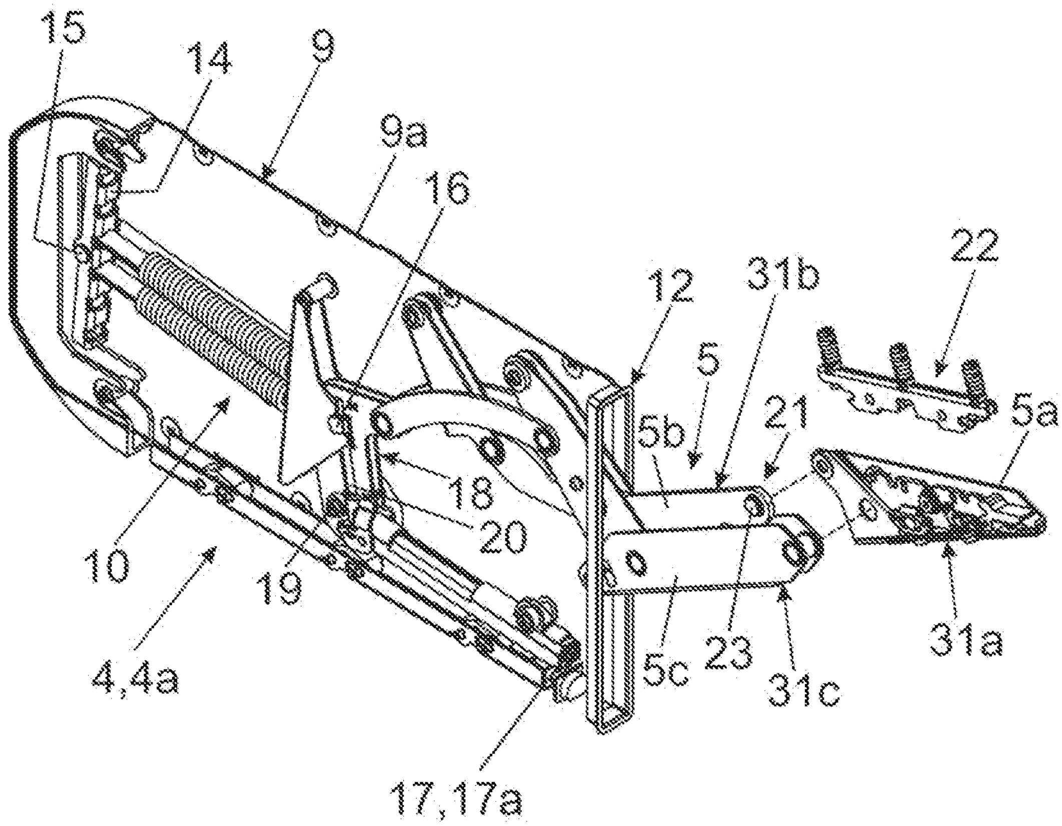
FIG. 3*a*, 3*b* is a perspective view of the furniture fitting in the form of a furniture drive and a schematic illustration of a pivot bearing.

FIG. 3*a* shows a perspective view of the furniture fitting 4 in the form of the furniture drive 4*a*. The spring device 10 for applying a force to the actuating arm assembly 5 can include a plurality of helical springs, in particular compression springs. The spring device 10 is supported with one end region on a supporting member 14, the supporting member 14 being pivotable about the pivoting axis 15. A second end region of the spring device 10 presses against a threaded nut 16, the threaded nut 16 being adjustably supported along a threaded spindle 20 by an adjustment device 17.

In the shown embodiment, the threaded spindle 20 is arranged on an intermediate lever 18 pivotably supported about a pivoting axis 19. By an actuation of a rotatably-mounted operating element 17*a* of the adjustment device 17, the threaded nut 16 is movable along the threaded spindle 20. As a result, a distance between the threaded nut 16 and the pivoting axis 19 of the intermediate lever 18 and thus the torque of the spring device 10 acting on the actuating arm assembly 5 can be adjusted. The actuating arm assembly 5, as is well known, is configured to be releasably locked to a fitting element 22, the fitting element 22 being configured to be fixed to the movable furniture part 3.

The furniture fitting 4 includes a first component 5*a* and at least one second component 5*b* hingedly connected to one another via at least one pivot bearing 21 having a bearing axis 23. The actuating arm assembly 5 includes a plurality of actuating arms 31*a*, 31*b*, 31*c* which are formed by the components 5*a*, 5*b*, 5*c*.

Figure 3B:
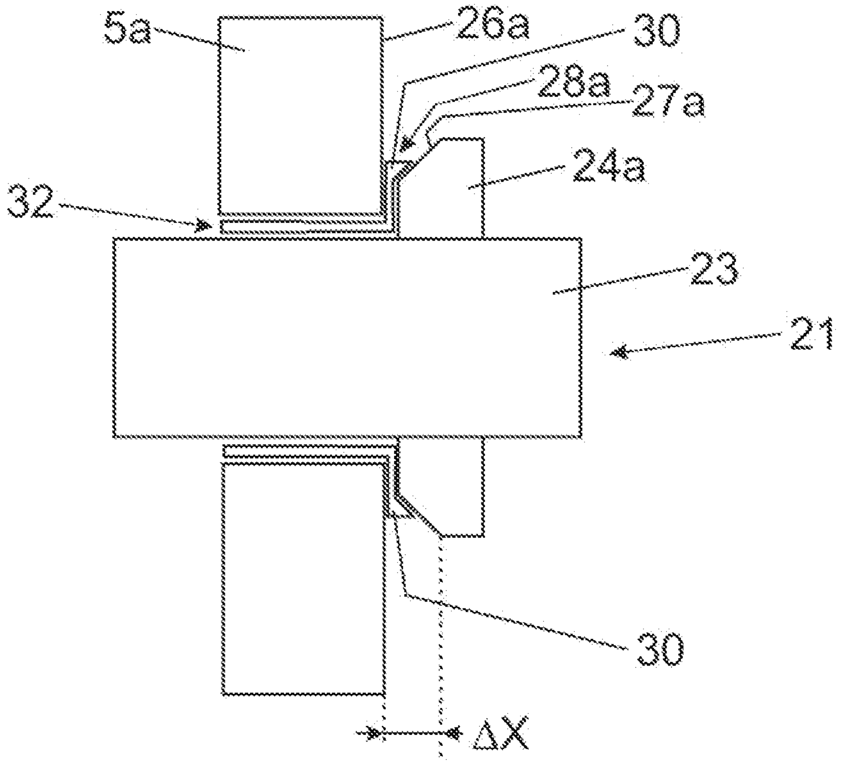

FIG. 3*b* shows a schematic view of a pivot bearing 21 for hingedly connecting the components 5*a*, 5*b* in the form of the actuating arms 31*a*, 31*b* to one another. The first component 5*a* is provided with a hole 32 in which the bearing axis 23 is arranged. Further, the first component 5*a* includes a first wall 26*a*.

The pivot bearing 21 includes at least one capillary disc 24*a* arranged on the at least one bearing axis 23. The capillary disc 24*a* includes a second wall 27*a*, the second wall 27*a* of the capillary disc 24*a* being spaced from the first wall surface 26*a* of the first component 5*a* by a gap 28*a* having a gap width (ΔX). The gap width (ΔX) decreases radially in a direction to the bearing axis 23, so that a lubricant 30 filled within the gap 28*a* can be transferred radially in a direction towards the bearing axis 23 and/or along the bearing axis 23 by a capillary force.

According to an embodiment, the second wall 27*a* of the capillary disc 24*a* extends inclinedly in a first gap section, and extends parallel to the first wall surface 26*a* of the first component 5*a* in a second gap section. It can be preferably provided that the surfaces 26*a*, 27*a* adopt an angle of between 15° and 45°, particularly preferred an angle of 30°, relative to each other in the first gap section.

The at least one capillary disc 24*a*, in a cross-section, can be at least partially configured so as to have a frustoconical shape.

FIG. 4*a*-4*d* show the pivot bearing 21 with the two hingedly connected components 5*a*, 5*b* in different views. The two components 5*a*, 5*b* are connected to each other via the bearing axis 23. The capillary disc 24*a* is supported on the bearing axis 23 and is arranged to oppose the first wall 26*a* of the first component 5*a*.

In the shown embodiment, the first component 5*a* includes at least two partial portions (first walls) 29*a*, 29*b* mutually spaced from one another in a direction of the bearing axis 23. The second component 5*b* is at least partially arranged between the two partial portions 29*a*, 29*b* of the first component 5*a*.

Figure 4A:
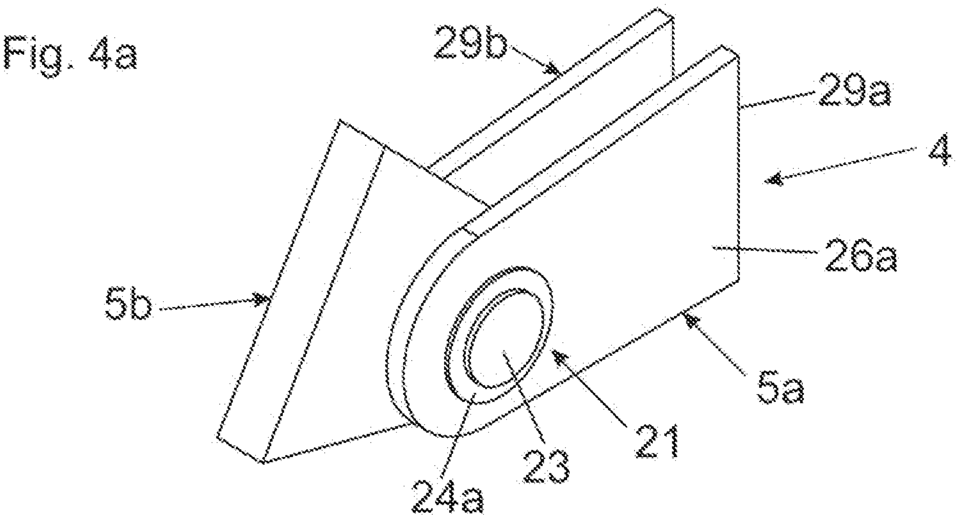
FIG. 4*a*-4*d* show a pivot bearing with the two hingedly connected components in different views.
Figure 4B:
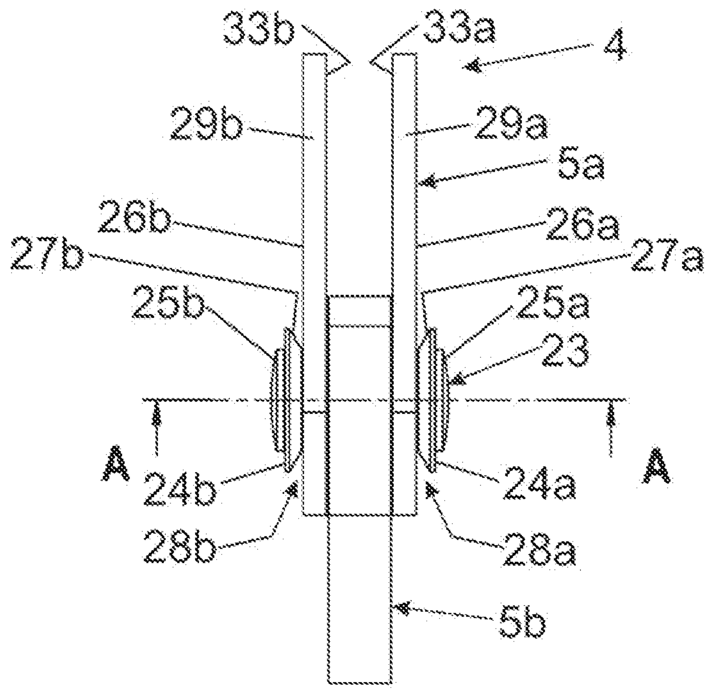

FIG. 4*b* shows the construction according to FIG. 4*a* in a view from the front. In the shown embodiment, two capillary discs 24*a*, 24*b* are arranged on the bearing axis 23. On each of the two partial portions (first walls) 29*a*, 29*b*, first wall surfaces 26*a*, 26*b* are formed, and the second walls 27*a*, 27*b* of the capillary discs 24*a*, 24*b* are spaced from the first wall surfaces 26*a*, 26*b* by a gap 28*a*, 28*b*. The gap width (ΔX) decreases at least over a region in a radial direction towards the bearing axis 23, so that the lubricant 30 to be filled into the gap 28*a*, 28*b* can be transferred radially in a direction towards the bearing axis 23 and/or along the bearing axis 23.

The bearing axis 23 can be configured as a rivet, and at least one capillary disc 24*a*, 24*b* is received between a, preferably broadened, end portion 25*a*, 25*b* of the rivet and the first wall 26*a* of the first component 5*a*.

The first (outer) surfaces 26*a*, 26*b* of the first walls 29*a*, 29*b* of the first component 5*a* are spaced from a second (inner) surface 33*a*, 33*b* of the first walls 29*a*, 29*b* by a material thickness of the walls 29*a*, 29*b*, preferably in a direction of the bearing axis 23, and the second wall surfaces 33*a*, 33*b* face towards the second component 5*b*.

Figure 4C:
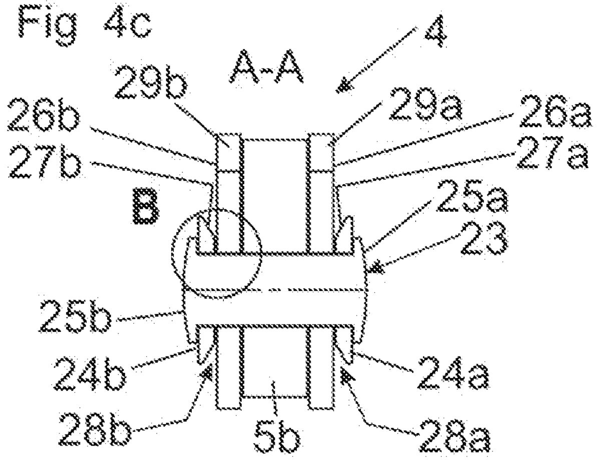

FIG. 4*c* shows a cross-sectional view along the plane A-A depicted in FIG. 4*b*. The two end portions 25*a*, 25*b* of the bearing axis 23 are deformed (for example, by clinching) such that the two capillary discs 24*a*, 24*b* are captively secured to the bearing axis 23.

Figure 4D:
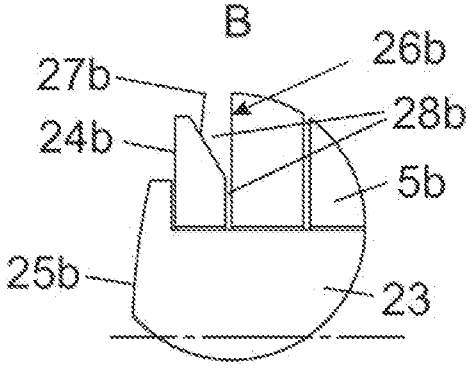

FIG. 4*d* shows the encircled region "B" of FIG. 4*c* in an enlarged view. The gap 28*b* can be seen, the gap 28*b* extending inclinedly in a first gap section, and extends parallel to the first wall surface 26*b* of the first component 5*a* in a second gap section. In the first gap section, the walls 26*b*, 27*b* can adopt an angle of between 15° and 45°, particularly preferred of 30°, relative to each other.

Figure 5A:
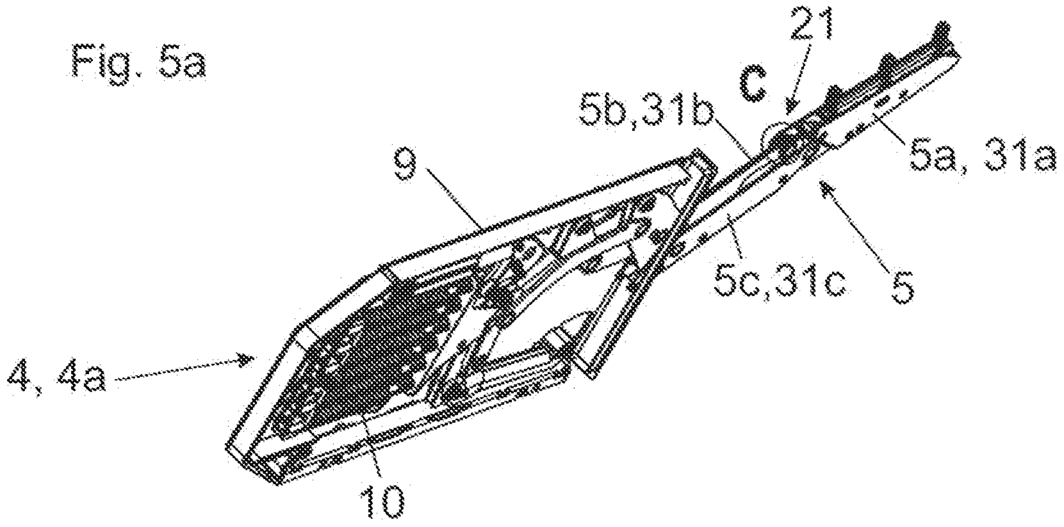
FIG. 5*a*, 5*b* show the furniture fitting in a perspective view and an enlarged detail view thereof.

FIG. 5*a* shows the furniture fitting 4 in the form of the furniture drive 4*a* in a perspective view.

The spring device 10 for applying a force to the actuating arm assembly 5 is arranged within the housing 9 of the furniture fitting 4. The actuating arm assembly 5 includes at least two components 5*a*, 5*b*, 5*c* hingedly connected to one another, the components 5*a*, 5*b*, 5*c* forming the actuating arm assembly 5.

Figure 5B:
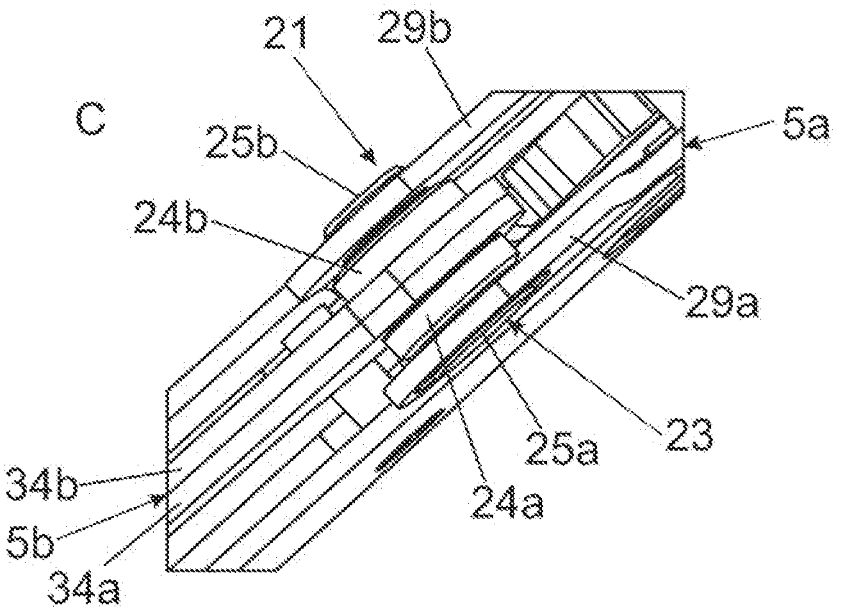

FIG. 5*b* shows the encircled region "C" of FIG. 5*a* in an enlarged view in which the pivot bearing 21 can be seen in greater detail. The first component 5*a* can include at least two partial portions (i.e., first walls) 29*a*, 29*b* mutually spaced from one another in a parallel relationship along the bearing axis 23, and the component 5*b* is at least partially received between the partial portions (walls) 29*a*, 29*b*.

The second component 5*b* can also include two partial portions (walls) 34*a*, 34*b* which, in the shown embodiment, flatly bear against each other. Two capillary discs 24*a*, 24*b* can be seen, a first capillary disc 24*a* being arranged between the first partial portion 34*a* of the second component 5*b* and the first partial portion 29*a* of the first component 5*a*. The second capillary disc 24*b* is arranged between the second partial portion 34*b* of the second component 5*b* and the second partial portion 29*b* of the first component 5*a*.

The pivot bearing 21 for hingedly connecting two components 5*a*, 5*b* has been described with the aid of the furniture fitting 4 in the form of the furniture drive 4*a* shown in the drawings. However, it is immediately apparent that the shown and described measures can also be applied in combination with other furniture fittings 4, such as furniture hinges or drawer pull-out guides for example.

The invention claimed is:

1. A furniture fitting comprising:

a first component; and a second component, wherein the first component and the second component are connected to each other via a pivot bearing having a bearing axis, and the first component includes a first wall, wherein the pivot bearing includes a capillary disc having a second wall, wherein the second wall is spaced from the first wall of the first component by a gap having a gap width, the gap width at least partially decreasing radially in a direction of the bearing axis, so that a lubricant filled into the gap is transferable radially in a direction towards the bearing axis and/or along the bearing axis by a capillary force, and wherein the second wall of the capillary disc extends at an incline in a first gap section, and extends parallel to the first wall of the first component in a second gap section.

2. The furniture fitting according to claim 1, wherein a first surface of the first wall of the first component is spaced from a second surface of the first wall by a material thickness of the first wall, the second surface of the first wall facing towards the second component.

3. The furniture fitting according to claim 2, wherein the first surface of the first wall of the first component is spaced from the second surface of the first wall in a direction of the bearing axis.

4. The furniture fitting according to claim 1, wherein the capillary disc is at least partially arranged between the first component and the second component.

5. The furniture fitting according to claim 1, wherein the gap spacing the second wall from the first wall is an annular gap having a gap width.

6. The furniture fitting according to claim 1, wherein, in the first gap section, the first wall and the second wall form an angle in a range of between 15° and 45° relative to one another.

7. The furniture fitting according to claim 6, wherein, in the first gap section, the first wall and the second wall form an angle of 30° relative to one another.

8. A furniture fitting comprising:

a first component; and a second component, wherein the first component and the second component are connected to each other via a pivot bearing having a bearing axis, and the first component includes a first wall, wherein the pivot bearing includes a capillary disc having a second wall, wherein the second wall is spaced from the first wall of the first component by a gap having a gap width, the gap width at least partially decreasing radially in a direction of the bearing axis so that a lubricant filled into the gap is transferable radially in a direction towards the bearing axis and/or along the bearing axis by a capillary force, and wherein a cross-section of the capillary disc is at least partially frustoconical.

9. A furniture fitting comprising:

a first component; and a second component, wherein the first component and the second component are connected to each other via a pivot bearing having a bearing axis, and the first component includes a first wall, wherein the pivot bearing includes a capillary disc having a second wall, wherein the second wall is spaced from the first wall of the first component by a gap having a gap width, the gap width at least partially decreasing radially in a direction of the bearing axis so that a lubricant filled into the gap is transferable radially in a direction towards the bearing axis and/or along the bearing axis by a capillary force, and wherein the first wall of the first component is a first one of at least two partial portions of the first component spaced from one another in a direction of the bearing axis, and the second component is at least partially arranged between the at least two partial portions of the first component.

10. A furniture fitting comprising:

a first component; and a second component, wherein the first component and the second component are connected to each other via a pivot bearing having a bearing axis, and the first component includes a first wall, wherein the pivot bearing includes a capillary disc having a second wall, wherein the second wall is spaced from the first wall of the first component by a gap having a gap width, the gap width at least partially decreasing radially in a direction of the bearing axis so that a lubricant filled into the gap is transferable radially in a direction towards the bearing axis and/or along the bearing axis by a capillary force, and wherein the pivot bearing is configured as a rivet, and the capillary disc is received between an end portion of the rivet and the first wall of the first component.

11. The furniture fitting according to claim 10, wherein the capillary disc is received between a broadened end portion of the rivet and the first wall of the first component.

12. A furniture fitting comprising:

a first component;

a second component, wherein the first component and the second component are connected to each other via a pivot bearing having a bearing axis, and the first component includes a first wall;

a housing; and an actuating arm assembly configured to pivot relative to the housing, the actuating arm assembly including at least two actuating arms, the at least two hinge arms comprising the first component and the second component and being hingedly connected to one another by the pivot bearing, wherein the pivot bearing includes a capillary disc having a second wall, wherein the second wall is spaced from the first wall of the first component by a gap having a gap width, the gap width at least partially decreasing radially in a direction of the bearing axis so that a lubricant filled into the gap is transferable radially in a direction towards the bearing axis and/or along the bearing axis by a capillary force.

13. An item of furniture comprising:

a furniture carcass;

a movable furniture part movably supported relative to the furniture carcass; and a furniture fitting comprising:

a housing connected to the furniture carcass;

a first component connected to the movable furniture part; and a second component connected to the housing, wherein the first component and the second component are connected to each other via a pivot bearing having a bearing axis, and the first component includes a first wall, wherein the pivot bearing includes a capillary disc having a second wall, wherein the second wall is spaced from the first wall of the first component by a gap having a gap width, the gap width at least partially decreasing radially in a direction of the bearing axis so that a lubricant filled into the gap is transferable radially in a direction towards the bearing axis and/or along the bearing axis by a capillary forces.

14. The item of furniture according to claim 13, wherein the movable furniture part is a furniture flap configured to pivot relative to the furniture carcass about a horizontally extending axis, the furniture carcass includes a furniture panel, and a housing of the furniture fitting is substantially entirely received within the furniture panel of the furniture carcass.

15. A method for producing a furniture fitting comprising:

a first component, and a second component, wherein the first component and the second component are connected to each other via a pivot bearing having a bearing axis, and the first component includes a first wall, wherein the pivot bearing includes a capillary disc having a second wall, wherein the second wall is spaced from the first wall of the first component by a gap having a gap width, the gap width at least partially decreasing radially in a direction of the bearing axis so that a lubricant filled into the gap is transferable radially in a direction towards the bearing axis and/or along the bearing axis by a capillary force, the method comprising:

connecting the first component and the second component of the furniture fitting to each other by the pivot bearing, the capillary disc being arranged on the bearing axis between the first wall and the second wall with the formation of the gap, filling a lubricant into the gap; and transferring the lubricant by a capillary force in a radial direction to the bearing axis and/or along the bearing axis, wherein the pivot bearing is a rivet, and an end portion of the rivet is deformed.

16. The method according to claim 15, wherein the capillary disc is received between the first wall and the deformed end portion of the rivet.

* * * * *